United States Patent Office 3,232,960
Patented Feb. 1, 1966

3,232,960
3-KETO-4-FLUORO- AND 3-KETO-4,4-DIFLUORO-STEROIDS AND PROCESS
Barney J. Magerlein, Portage Township, Kalamazoo County, and Fred Kagan, Kalamazoo Township, Kalamazoo County, Mich., assignors to The Upjohn Company, Kalamazoo, Mich., a corporation of Delaware
No Drawing. Filed Oct. 8, 1959, Ser. No. 845,101
29 Claims. (Cl. 260—397.1)

This invention relates to a novel process for the production of 4,4-difluoro-$\Delta^5$-3-keto and 4-fluoro-$\Delta^{4,6}$-3-keto steroids and to the compounds thus produced.

It has been found that the physiological activity of $\Delta^4$-3-keto steroids is maintained in the presence of a 4-fluorine atom and therapeutic ratios are often improved. For example, 4-fluoro-$\Delta^4$-3-keto and 4-fluoro-$\Delta^{4,6}$-3-keto steroids of the testosterone series have androgenic-anabolic activity, as well as possessing improved therapeutic ratios. Similarly, the 4-fluoro steroids in the progesterone series possess outstanding progestational activity, when compared with the corresponding active compounds without the 4-fluoro group. 4-fluoro-$\Delta^4$-3-keto compounds of the adrenocorticoid hormone series can be prepared possessing glucocorticoid anti-inflammatory activity. Many other 4-fluoro-$\Delta^4$-3-keto and 4-fluoro-$\Delta^{4,6}$-3-keto steroids are useful as intermediates in the production of compounds possessing pharmacological activity. For example, 4-fluoro-$\Delta^4$-3-keto steroids of the sigmastane, sitostane, cholestone, norcholane and bisnorcholane series can be converted to compounds of the pregnane and androstane series in exactly the same manner as the corresponding compounds without the 4-fluoro group.

The novel 4-fluoro-$\Delta^{4,6}$-3-keto steroids of this invention can be hydrogenated, e.g., with about a mole of hydrogen and a hydrogenation catalyst, e.g., palladium on charcoal, to produce 4-fluoro-$\Delta^4$-3-keto steroids having utility as intermediates and as physiologically active end products, e.g., having androgenic and anabolic, progestational, or anti-inflammatory and glucocorticoid activity, as described hereinabove.

According to this invention, a 3-enamine of a $\Delta^4$-3-keto steroid unsubstituted at position 4 is reacted with at least two molar equivalents of perchloryl fluoride to produce a 4,4-difluoro-$\Delta^5$-3-keto steroid. This steroid is then reacted with a hydrazine to produce the corresponding 3-hydrazone. The hydrazone is then reacted with strong acid to produce the corresponding 3-hydrazone of a 4-fluoro-$\Delta^{4,6}$-3-keto steroid. The 3-hydrazone is then hydrolyzed with a compound having an activated carbonyl group to regenerate the 3-keto group and produce a 4-fluoro-$\Delta^{4,6}$-3-keto steroid. This process, exemplified by the pyrrolidyl enamine of a steroid otherwise unsubstituted in the A and B rings, may be illustrated by the following formulae:

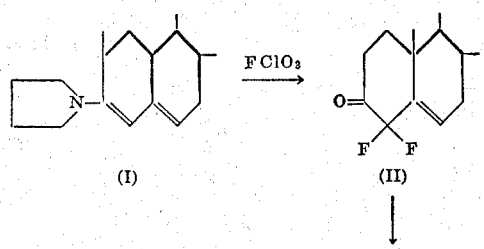

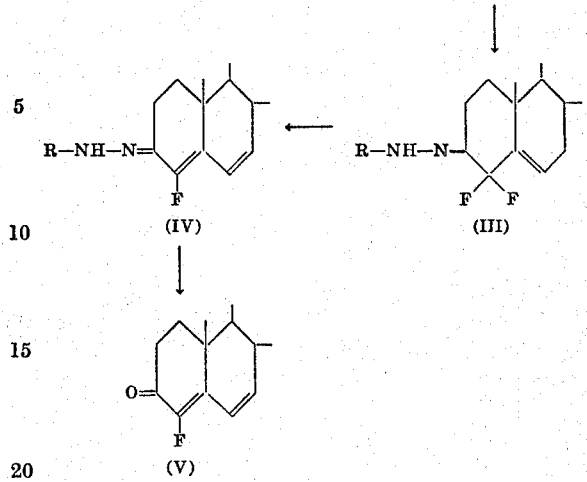

In the above formulae, the rings represent the A and B rings of a steroid and R is hydrogen, aliphatic or aromatic.

The starting compounds of the process of this invention are the 3-enamines of $\Delta^4$-3-keto steroids unsubstituted at position 4. This is a well known class of steroids. See Heyl and Herr, J. Am. Chem. Soc., 75, 1918 (1953); ibid, page 5927; ibid, 77, 488 (1955); Hogg et al., ibid 77, 4436 (1955); ibid, page 4438, and U.S. Patent 2,781,342. These starting compounds are unsubstituted in the 4-position and preferably otherwise unsubstituted in the A and B rings, as shown in the above formulae. However, an alkyl or fluoro group, for example, can be present at the 2 and/or 6 position. These compounds are prepared by reacting the selected $\Delta^4$-3-keto steroid, preferably of stigmastane, sitostane, cholestane, norcholane, bisnorcholane and most preferably of the pregnane or androstane series, with the selected secondary amine, preferably in the presence of an acid catalyst, to produce the corresponding 3-enamine. Starting 3-enamines include those wherein the amino group is cyclic, e.g., pyrrolidyl, alkyl substituted-pyrrolidyl, e.g., 2-methylpyrrolidyl, 3-methylpyrrolidyl, 3,4-dimethylpyrrolidyl, piperidyl, alkyl substituted-piperidyl, e.g., 2-methylpiperidyl, morpholino, tetrahydroquinoline, dialkylamino, e.g., diethylamino, dipropylamino, dioctylamino, cycloalkylamino, e.g., cyclohexyl-N-methylamino, dicyclohexyl, aralkylamino, e.g., N-methylbenzylamino, and the enamine is that of $\Delta^4$-3-keto steroid, e.g., cholestenone, stigmastadienone, 4,7,22-ergostatrien-3-one, 3-keto-4-norcholene, 3-keto-4-bisnorcholene, 3-keto-4-etiocholenic acid methyl ester, 22,22-diphenyl-4,20-bisnorcholen-3-one, progesterone, 11-keto-progesterone, 11-dehydroprogesterone, 11α-hydroxyprogesterone, 6α-methylprogesterone, 2α-methylprogesterone, 2α-fluoro-progesterone, 6α-fluoroprogesterone, 4-androstene-3,17-dione, 4-androstene-3,11,17-trione, and testosterone. With each of the above-named $\Delta^4$-3-keto steroids, the 3-enamine thereof is preferably the 3-pyrrolidyl enamine.

The starting 3-enamine of a $\Delta^4$-3-keto steroid may have other substituents such as, for example, ketone, hydroxy, acyloxy, carbaloxy, methyl, hydroxy, or double bond at one or more positions of the nucleus or side chain, e.g., 7, 11, 12, 15, 16, 17, 20, and 21-positions. Included are the 3-enamines of $\Delta^4$-3-keto steroids described in U.S. Patent 2,781,342. Some of these substitutents are reactive toward the reagents employed in the process of this invention and an appropriate increased amount of these reagents, should be employed to achieve optimum yields of desired product.

In carrying out the process of this invention, the selected 3-enamine of a Δ⁴-3-keto steroid is reacted with at least two molar equivalents of perchloryl fluoride to produce a 4,4-difluoro-Δ⁵-3-keto steroid. This is conveniently achieved by bubbling perchloryl fluoride into a solution of the selected enamine in a solvent inert to the perchloryl fluoride at the reaction temperature, e.g., benzene, toluene, diethyl ether, tetrahydrofuran, dioxane, dimethyl sulfoxide, the halogenated hydrocarbons, e.g., chloroform, etc., at a temperature between about −75° C. to the boiling point of the reaction mixture, with −10 to +10° C. being preferred. Alternatively, a solution of perchloryl fluoride in one of the above-described solvents can be mixed with the solution of the 3-enamine. Reaction time varies with the reaction temperature, e.g., from a few minutes to several hours. Within the preferred reaction temperature range, only a few minutes reaction time is required. The reaction product can be isolated, e.g., by evaporation of the reaction solvent and fractional crystallization or chromatography of the residue, or can be employed directly as an intermediate in the production of the 4-fluoro-Δ⁴,⁶-3-keto steroids.

The conversion of a 4,4-difluoro-Δ⁵-3-keto steroid to a 4-fluoro-Δ⁴,⁶-3-keto steroid is accomplished by the steps of (1) converting the 3-keto group to a hydrazone; (2) heating the hydrazone with strong acid to produce the corresponding hydrazone of a 4-fluoro-Δ⁴,⁶-3-keto steroid; and (3) removing the hydrazone group with a compound containing an activated carbonyl group to regenerate the 3-keto group and produce a 4-fluoro-Δ⁴,⁶-3-keto steroid.

The conversion of a 3-keto steroid to a hydrazone derivative thereof is a well known reaction involving the reaction of the 3-keto steroid with a hydrazine compound, preferably under acidic conditions. The term hydrazine compound, when employed herein, means a compound containing the radical —NHNH₂. Hydrazines which can be employed in the process of this invention include, in addition to hydrazine itself, the alkyl and aryl hydrazines, e.g., methylhydrazine, phenylhydrazine, p-nitrophenylhydrazine, 2,4-dinitrophenylhydrazine, o-, m- and β - tolylhydrazine, β - bromophenylhydrazine, α,α-methylphenylhydrazine, β-naphthylhydrazine, semicarbazide, thiosemicarbazide, benzoylhydrazine and its nitro substituted derivatives, semioxamazide, and aminoguanidine. Preferred are the hydrazines containing less than twelve carbon atoms. Acidic conditions can be achieved by employing an acid addition salt, e.g., hydrochloride or formate, of the selected hydrazine or by adding a solution of the selected hydrazine in acid, e.g., alcoholic hydrochloric acid, aqueous perchloric, sulfuric or acetic acid, to a solution of the 4,4-difluoro-Δ⁵-3-keto steroid in an organic solvent, e.g., methanol, ethanol, dioxane, tetrahydrofuran. Room temperature is ordinarily employed as the reaction temperature for convenience. However, temperatures considerably above and below this temperature, e.g., 10 to 100° C., are operable. Ordinarily the reaction time is from a few minutes to several hours, the exact time depending in part, upon the reaction temperature and the selected starting steroid and hydrazine compound. As the resultant hydrazone is ordinarily considerably less soluble than the starting steroid, the reaction's progress can often be governed by the appearance of crystals in the reaction mixture which can then be isolated and purified, if desired, in the usual manner.

The phenylhydrazones, and particularly 2,4-dinitrophenylhydrazine, are preferred if readily crystallizable compounds with good melting points are desired. However, some of the resulting hydrazones, e.g., 2,4-dinitrophenylhydrazone, are quite resistant to removal to regenerate the 3-keto group by reaction with a compound having an activated carbonyl [See Mattox and Kendall, J. Biol., Chem., 185,589 (1950)]. For this reason, semicarbazide is the preferred hydrazine compound if a hydrazone which is readily regenerated to a 3-keto group is desired, as a semicarbazone group is much more readily removed to regenerate the 3-keto group than are most of the other hydrazones, particularly the arylhydrazones. For a satisfactory procedure, see McGuckin and Kendall, J. Am. Chem. Soc., 74, 5811 (1952).

The thus-produced hydrazone is converted to the corresponding hydrazone of a 4-fluoro-Δ⁴,⁶-3-keto steroid by heating a solution thereof in the presence of strong acid, i.e., one having a pK$_a$ of less than 5, e.g., acetic, formic, alcoholic hydrochloric, or phosphoric acid, for from several minutes to several hours, preferably at a temperature considerably above room temperature, e.g., 40° to 150° C. and conveniently at the reflux temperature of the reaction mixture. As is apparent, if, the initial reaction between the selected 4,4-difluoro-Δ⁵-3-keto steroid and a hydrazine is conducted at elevated temperatures in the presence of strong acid, the intermediately produced hydrazine of the 4,4-difluoro-Δ⁵-3-keto steroid will be converted immediately to the hydrazone of a 4-fluoro-Δ⁴,⁶-3-keto steroid, thus combining the two steps into one. As in the previous step, the thus-produced hydrazone of a 4-fluoro-Δ⁴,⁶-3-keto steroid can be isolated, if desired, by fractional crystallization.

The thus-produced hydrazone of a 4-fluoro-Δ⁴,⁶-3-keto steroid is then reacted with a compound containing an activated carbonyl group to regenerate the 3-keto group. This reaction employs the well-known reversibility of hydrazone formation in the presence of a highly active carbonyl compound, i.e., aldehyde or ketone, such as, for example, glyoxal, pyruvaldehyde, diacetyl, ethyl acetoacetate, ethyl benzoylacetate, phenylglyoxal, pyruvic acid, glyoxalic acid, malonaldehydic acid, benzoylformic acid, α-phenyl-α-methylglyoxal and diphenylglyoxal. Included among these highly active carbonyl compounds are α-ketoaldehydes, α-diketones, α-ketoacids and esters thereof, β-ketoaldehydes, β-diketones, and β-ketoacids and esters thereof, of both the aliphatic and aromatic series, and preferably hydrocarbon alkyl and aryl, i.e., free from hetero atom substitution. These preferred compounds can be represented by the formulae

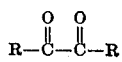

and

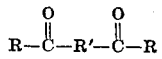

wherein R is hydrogen, lower-alkyl, lower-hydrocarbonaryl, and one R can also be hydroxy or lower-hydrocarbonoxy, and R' is a methylene radical containing from one to eight carbon atoms, e.g., methylene, methylmethylene, phenylmethylene. The reaction is ordinarily conducted at a temperature above room temperature, e.g., about 35° to about 150° C., in the presence of a large molar excess of the activated carbonyl compound for several hours, to ensure optimum yield. The 4-fluoro-Δ⁴,⁶-3-keto steroid can then be isolated in the usual manner, e.g., separating the steroid from the other reaction products by fractional crystallization or chromatography.

The thus-produced 4-fluoro-Δ⁴,⁶-3-keto steroid is converted to a 4-fluoro-Δ⁴-3-keto steroid by hydrogenation under relatively mild conditions, e.g., atmospheric or low pressure conditions, employing a palladium catalyst, e.g., on charcoal or a mildly basic carrier, e.g., zinc oxide-zinc carbonate, cadmium carbonate or strontium carbonate. The hydrogenation is conducted until about a molar equivalent of hydrogen is absorbed, unless other functional groups are present which are concomitantly reduced, thus requiring proportionately increased amounts of hydrogen to obtain optimum yields of 4-fluoro-Δ⁴-3-keto steroid.

The following examples are illustrative of the process and products of the present invention, but are not to be construed as limiting.

*Example 1.—3,11-diketo-4,4-difluoro-5,17(20)-[cis]-pregnadien-21-oic acid methyl ester*

Perchloryl fluoride was bubbled through a solution of 10 g. of the 3-pyrrolidyl enamine of 3,11-diketo-4,17-(20)-[cis]-pregnadien-21-oic acid methyl ester [Hogg et al., J. Am. Chem. Soc., 77, 4436 (1955)] in 2 liters of dry benzene for five minutes. The reaction mixture was washed with saturated aqueous sodium bicarbonate and then dried. The solvent was evaporated and the residual 3,11-diketo-4,4 - difluoro - 5,17(20)-[cis]-pregnadien-21-oic acid methyl ester was crystallized from ethyl acetate to give crystals thereof melting at 212–214° C. Two recrystallizations raised the melting point to 228° C. (dec.);

$$\lambda_{max.}^{EtOH} \ 224 \ m\mu, a_M \ 11,900$$

The compound had the correct elemental analysis and the following infrared absorption peaks expressed in cm.$^{-1}$: 1758, 1737 (C=O); 1700 (conj. 21-ester+non-conj. keto); 1653 sh., 1640 (conj. $\Delta^{17}$); 1215, 1205, 1180, 1170 (C=O).

Following the procedure of Example 1, the 3-pyrrolidyl enamine of other 3,11-diketo-4,17(20)-[cis]-pregnadien-21-oic acid lower-alkyl esters, e.g., ethyl, propyl, butyl, octyl ester, are converted to the corresponding 3,11-diketo-4,4 - difluoro-5,17(20) - [cis]-pregnadien-21-oic acid lower-alkyl ester.

Following the procedure of Example 1, the 3-pyrrolidyl enamine of 3-keto - 11α-hydroxy-4-17(20) - [cis]-pregnadien-21-oic acid methyl ester, the 3-pyrrolidyl enamine of 3-keto-4,17(20)-[cis]-pregnadien-21-oic acid methyl ester and the 3-pyrrolidyl enamine of 3-keto-4,9(11),-17(20)-[cis]-pregnatrien-21-oic acid methyl ester are converted to 3-keto-4,4-difluoro-11α-hydroxy-5,17(20)-[cis]-pregnadien-21-oic acid methyl ester, 3-keto-4,4-difluoro-5,17(20)-[cis]-pregnadien-21-oic acid methyl ester and 3-keto-4,4 - difluoro-5,9(11),17(20) - [cis]-pregnatrien-21-oic acid methyl ester, respectively.

*Example 2.—4,4-difluoro-5-androstene-3,17-dione*

Following the procedure of Example 1, 5.0 g. of the 3-pyrrolidyl enamine of 4-androstene-3,17-dione was converted to 4,4-difluoro-5-androstene-3,17-dione.

Similarly, the 3-pyrrolidyl enamine of 4-androstene-3,11,17-trione, the 3-pyrrolidyl enamine of 11α-hydroxy-4-androstene-3,17-dione and the 3 - pyrrolidyl enamine of 17α-methyl-17β-hydroxy-4-androsten-3-one are converted to 4,4-difluoro-5-androstene-3,11,17-trione, 4,4 - difluoro-11α-hydroxy-5-androstene-3,17-dione and 4,4 - difluoro-17α-methyl-17β-hydroxy-5-androsten-3-one, respectively.

*Example 3.—4,4-difluoro-5-pregnene-3,20-dione*

Following the procedure of Example 1, 5.0 g. of the 3-pyrrolidyl enamine of progresterone was converted to 4,4-difluoro-5-pregnene-3,20-dione.

Similarly, the 3-pyrrolidyl enamines of 11α-hydroxyprogesterone, 11-ketoprogesterone, 11-dehydroprogesterone, and $\Delta^{9(11)}$-dehydroprogesterone are converted to 4,4-difluoro-11α-hydroxy-5-pregnene-3,20-dione, 4,4-difluoro-5-pregnene-3,11,20-trione, 4,4-difluoro-5,11 - pregnadiene-3,20-dione, and 4,4-difluoro-5,9(11)-pregnadiene - 3,20-dione, respectively.

*Example 4.—4,4-difluoro-11,21-dihydroxy-5,17(20)-[cis]-pregnadien-3-one 21-acetate*

Perchloryl fluoride was bubbled for five minutes at room temperature through a solution of 2.7 g. of the 3-pyrrolidyl enamine of 11β,21-dihydroxy-4,17(20)-pregnadien-3-one 21-acetate in 500 ml. of dry benzene. The mixture was then washed with saturated aqueous sodium bicarbonate and then with saturated aqueous sodium chloride. After drying over sodium sulfate, the benzene solution was chromatographed over 200 g. of magnesium silicate which was eluted with hexanes (Skellysolve B) containing increasing proportions of acetone. Hexanes plus 12 percent acetone eluted 4,4-difluoro-11β,21-dihydroxy - 4,17(20)-[cis]-pregnadien-3-one 21-acetate.

*Example 5.—3,11-diketo-4,4-difluoro-5,17(20)-[cis]-pregnadien-21-oic acid methyl ester 3-(2',4'-dinitrophenylhydrazone)*

A solution of 110 mg. of 2,4-dinitrophenylhydrazine in 3 ml. of 30 percent perchloric acid was added to a solution of 200 mg. of 3,11-diketo-4,4-difluoro-5,17(20)-[cis]-pregnadien-21-oic acid methyl ester in 60 ml. of 95 percent ethyl alcohol. The mixture was stirred for 90 minutes with crystals forming within ten minutes. The 200 mg. of precipitated crystals of 3,11-diketo-4,4-difluoro-5,17(20)-[cis]-pregnadien-21-oic acid methyl ester 3-(2',4'-dinitrophenylhydrazone) melted at above 360° C., and had $$\lambda_{max.}^{CHCl_3} \text{ at } 260 \ m\mu, a_M \ 14,700; \text{ and } 351 \ m\mu, a_M \ 25,500$$

Following the procedure of Example 5, other 3,11-diketo-4,4-difluoro-5,17(20)-[cis]-pregnadien-21 - oic acid lower-alkyl esters, e.g., ethyl, propyl, butyl, octyl, are converted to the corresponding 3,11-diketo-4,4-difluoro-5, 17(20)-[cis]-pregnadien-21-oic acid lower-alkyl ester 3-(2',4'-dinitrophenylhydrazone).

Following the procedure of Example 5, 3-keto-4,4-difluoro-11α-hydroxy-5,17(20)-[cis]-pregnadien-21-oic acid methyl ester, 3-keto-4,4-difluoro-5,17(20) - [cis] - pregnadien-21-oic acid methyl ester, 3-keto-4,4-difluoro-5,9 (11),17(20)-[cis]-pregnadien-21-oic acid methyl ester and 4,4-difluoro-11β,21-dihydroxy-5,17(20)-[cis] - pregnadien-3-one-21-acetate are converted to their 3-(2',4'-dinitrophenylhydrazones).

*Example 6.—4,4-difluoro-5-androstene-3,17-dione 3-(2',4'-dinitrophenylhydrazone)*

Following the procedure of Example 5, 4,4-difluoro-5-androstene-3,17-dione was converted to 4,4-difluoro-5-androstene-3,17-dione 3-(2',4'-dinitrophenylhydrazone).

Similarly, 4,4-difluoro-5-androstene-3,11,17-trione, 4,4-difluoro-11α-hydroxy-5-androstene-3,17-dione and 4,4-difluoro-17α-methyl-17β-hydroxy-5-androsten - 3 - one are converted to their 3-(2',4'-dinitrophenylhydrazones).

*Example 7.—4,4-difluoro-5-pregnene-3,20-dione 3-(2',4'-dinitrophenylhydrazone)*

Following the procedure of Example 5, 4,4-difluoro-5-pregnene-3,20-dione was converted to 4,4-difluoro-5-pregnene-3,20-dione 3-(2',4'-dinitrophenylhydrazone).

Similarly, 4,4-difluoro-11α-hydroxy-5-pregnene - 3,20-dione, 4,4-difluoro-5-pregnene-3,11,20-trione, 4,4-difluoro-5,11-pregnadiene-3,20-dione and 4,4-difluoro - 5,9(11)-pregnadiene-3,20-dione are converted to their 3 - (2',4'-dinitrophenylhydrazones).

Substituting semicarbazide for the 2,4-dinitrophenylhydrazine in each of the reactions described in Examples 5 to 7 is productive of the corresponding 3-semicarbazones instead of the 3-(2',4'-dinitrophenylhydrazones). Similarly, hydrazine and phenylhydrazine produce the 3-hydrazones and 3-phenylhydrazones, respectively, of the above-described starting 4,4-difluoro-$\Delta^5$-3-keto steroids.

*Example 8.—3,11-diketo-4-fluoro-4,6,17(20)-[cis] - pregnatrien-21-oic acid methyl ester 3-(2',4'-dinitrophenylhydrazone)*

A solution of 50 mg. of 3,11-diketo-4,4-difluoro-5,17 (20)-[cis]-pregnadien-21-oic acid methyl ester 3-(2',4'-dinitrophenylhydrazone) in 20 ml. of glacial acetic acid was heated under reflux for 15 minutes. The mixture was concentrated to 10 ml. and 30 mg. of crystals of 3,11-diketo-4-fluoro-4,6,17(20)-[cis]-pregnatrien - 21 - oic acid methyl ester 3-(2',4' - dinitrophenylhydrazone) precipitated. These crystals melted at 305° C. (dec.), had the correct fluorine analysis and had $$\lambda_{max.}^{CHCl_3} \text{ at } 296 \ m\mu, a_M \ 12,500; \ 309 \ m\mu, a_M \ 15,400; \text{ and } 392 \ m\mu, a_M \ 39,450.$$

Following the procedure of Example 8, 3,11-diketo-4,4-difluoro-5,17(20)-[cis]-pregnadien-21-oic acid lower-alkyl ester 3-(2',4'-dinitrophenylhydrazone), e.g., ethyl, propyl, butyl, octyl ester, are converted to the corresponding 3,11-diketo-4-fluoro-4,6,17(20)-[cis]-pregnatrien-21-oic and lower-alkyl ester 3-(2',4'-dinitrophenylhydrazone).

Following the procedure of Example 8, the 3-(2',4'-dinitrophenylhydrazone) of 3-keto-4,4-difluoro-11α-hydroxy-5,17(20)-[cis]-pregnadien-21-oic acid methyl ester, 3-keto-4,4-difluoro-5,17(20)-[cis]-pregnadien-21-oic acid methyl ester, 3-keto-4,4-difluoro-5,9(11),17(20)-[cis]-pregnatrien-21-oic acid methyl ester and 4,4-difluoro-11β,21-dihydroxy-5,17(20)-[cis]-pregnadien-3-one 21-acetate are converted to the 3-(2',4'-dinitrophenylhydrazone) of 3-keto-4-fluoro-11α-hydroxy-4,6,17(20)-[cis]-pregnatrien-21-oic acid methyl ester, 3-keto-4-fluoro-4,6,17(20)-[cis]-pregnatrien-21-oic acid methyl ester, 3-keto-4-fluoro-4,6,9(11),17(20)-[cis]-pregnatetraen-21-oic acid methyl ester and 4-fluoro-11β,21-dihydroxy-4,6,17(20)-[cis]-pregnatrien-3-one 21-acetate, respectively.

*Example 9.—4-fluoro-4,6-androstadiene-3,17-dione 3-(2',4'-dinitrophenylhydrazone)*

Following the procedure of Example 8, 4,4-difluoro-5-androstene-3,17-dione 3-(2',4'-dinitrophenylhydrazone) was converted to 4-fluoro-4,6-androstadiene-3,17-dione 3-(2',4'-dinitrophenylhydrazone).

Similarly, the 3-(2',4'-dinitrophenylhydrazone) of 4,4-difluoro-5-androstene-3,11,17-trione, 4,4-difluoro-11α-hydroxy-5-androstene-3,17-dione, and 4,4-difluoro-17α-methyl-17β-hydroxy-5-androsten-3-one are converted to the 3-(2',4'-dinitrophenylhydrazone) of 4-fluoro-4,6-androstene-3,11,17-trione, 4-fluoro-11α-hydroxy-4,6-androstene-3,17-dione and 4-fluoro-17α-methyl-17β-hydroxy-5-androsten-3-one, respectively.

*Example 10.—4-fluoro-4,6-pregnadiene-3,20-dione 3-(2',4'-dinitrophenylhydrazone)*

Following the procedure of Example 8, 4,4-difluoro-5-pregnene-3,20-dione 3-(2',4'-dinitrophenylhydrazone) was converted to 4-fluoro-4,6-pregnadiene-3,20-dione 3-(2',4'-dinitrophenylhydrazone).

Similarly, the 3-(2',4'-dintrophenylhydrazone) of 4,4-difluoro-11α-hydroxy-5-pregnene-3,20-dione, 4,4-difluoro-5-pregnene-3,11,20-trione, 4,4-difluoro-5,11-pregnadiene-3,20-dione and 4,4-difluoro-5,9(11)-pregnadiene-3,20-dione are converted to the 3-(2',4'-dinitrophenylhydrazone) of 4-fluoro-11α-hydroxy-4,6-pregnadiene-3,20-dione, 4-fluoro-4,6-pregnadiene-3,11,20-trione, 4-fluoro-4,6,11-pregnatriene-3,20-dione, and 4-fluoro-4,6,9(11)-pregnatriene-3,20-dione, respectively.

Substituting the 3-semicarbazone, 3-hydrazone, or 3-phenylhydrazone for the 3-(2',4'-dinitrophenylhydrazone) of the 4,4-difluoro-Δ⁵-3-keto steroids of Examples 8–10 is productive of the 3-semicarbazone, 3-hydrazone, or 3-phenylhydrazone, respectively, of the corresponding 4-fluoro-Δ⁴,⁶-3-keto steroid reaction products of these examples.

*Example 11.—3,11-diketo-4-fluoro-4,6,17(20)-[cis]-pregnatrien-21-oic acid methyl ester*

A mixture of 100 mg. of 3,11-diketo-4-fluoro-4,6,17(20)-[cis]-pregnatrien-21-oic acid methyl ester 3-(2',4'-dinitrophenylhydrazone) in 3.5 ml. of chloroform, 5 ml. of pyruvic acid containing 0.2 ml. of water and 0.3 ml. of 2.5 N hydrogen bromide in glacial acetic acid was maintained at 45° C. for 24 hours. Water and chloroform was added and the organic layer was separated, washed with water and evaporated. The residue was taken up in benzene and reacted with diazomethane to re-esterify any hydrolyzed steroid. The solution was chromatographed over magnesium silicate (Florisil). The column was developed with hexanes (Skellysolve B) containing increasing amounts of acetone. There was thus obtained 3,11-diketo-4-fluoro-4,6,17(20)-[cis]-pregnatrien-21-oic acid methyl ester.

Following the procedure of McGuckin and Kendall, J. Am. Chem. Soc., 74, 5811 (1952), 3,11-diketo-4-fluoro-4,6,17(20)-[cis]-pregnatrien-21-oic acid methyl ester 3-semicarbazone was hydrolyzed for 48 hours in chloroform containing aqueous acetic acid and a large equivalent excess of pyruvic acid to produce 3,11-diketo-4-fluoro-4,6,17(20)-[cis]-pregnatriene-21-oic acid methyl ester.

Following the procedure of Example 11, other 3,11-diketo-4-fluoro-4,6,17(20)-[cis]-pregnatrien-21-oic acid lower-alkyl ester 3-(2',4'-dinitrophenylhydrazone) and 3-semicarbazone, e.g., ethyl, propyl, butyl octyl ester, are hydrolyzed to the corresponding 3,11-diketo-4-fluoro-4,6,17(20)-[cis]-pregnatrien-21-oic acid lower-alkyl ester.

Following the procedure of Example 11, the 3-(2',4'-dinitrophenylhydrazone) and the 3-semicarbazone of 3-keto-4-fluoro-11α-hydroxy-4,6,17(20)-[cis]-pregnatrien-21-oic acid methyl ester, 3-keto-4-fluoro-4,6,17(20)-[cis]-pregnatrien-21-oic acid methyl ester, 3-keto-4-fluoro-4,6,9(11),17(20)-[cis]-pregnatetraen-21-oic acid methyl ester and 4-fluoro-11β,21-dihydroxy-4,6,17(20)-[cis]-pregnatrien-3-one 21-acetate are hydrolyzed with pyruvic acid to regenerate the 3-keto group. Similar results are obtained when pyruvaldehyde, p-hydroxybenzaldehyde or phenylglyoxal are employed instead of pyruvic acid.

*Example 12.—4-fluoro-4,6-androstadiene-3,17-dione*

Following the procedure of Example 11, the 3-(2',4'-dinitrophenylhydrazone) and the 3-semicarbazone of 4-fluoro-4,6-androstadiene-3,17-dione are hydrolyzed with pyruvic acid to 4-fluoro-4,6-androstadiene-3,17-dione.

Similarly, the 3-(2',4'-dinitrophenylhydrazone) and 3-semicarbazones of 4-fluoro-4,6-androstadiene-3,11,17-trione, 4-fluoro-11α-hydroxy-4,6-androstadiene-3,17-dione and 4-fluoro-17α-methyl-17β-hydroxy-4,6-androstadien-3-one are hydrolyzed with pyruvic acid to regenerate the 3-keto group. All of the above androstane series steroid reaction products possesses anabolic and androgenic activity.

*Example 13.—4-fluoro-4,6-pregnadiene-3,20-dione*

Following the procedure of Example 11, the 3-(2',4'-dinitrophenylhydrazone) and the 3-semicarbazone of 4-fluoro-4,6-pregnadiene-3,20-dione are hydrolyzed with pyruvic acid to produce 4-fluoro-4,6-pregnadiene-3,20-dione.

Similarly, the 3-(2',4'-dinitrophenylhydrazone) and 3-semicarbazones of 4-fluoro-11α-hydroxy-4,6-pregnadiene-3,20-dione, 4-fluoro-4,6,11-pregnatriene-3,20-dione, 4-fluoro-4,6-pregnadiene-3,12,20-trione and 4-fluoro-4,6,9(11)-pregnatriene-3,20-dione are hydrolyzed with pyruvic acid to regenerate the 3-keto group. The above pregnane series steroid reaction products possess progestational activity.

3,11-diketo-4-fluoro-4,6,17(20)-[cis]-pregnatrien-21-oic acid methyl ester is converted to compounds possessing anti-inflammatory and glucocorticoid activity by the following series of reactions, in exactly the analogous manner described by Hogg et al., J. Am. Chem. Soc., 77, 4436 (1955): a solution of the above compound, a large molar excess of pyrrolidine and a catalytic amount of p-toluenesulfonic acid in benzene is refluxed for 8 hours with continuous removal of the water of reaction by a trap to produce the 3-pyrrolidyl enamine of 3,11-diketo-4-fluoro-4,6,17(20)-[cis]-pregnatrien-21-oic acid methyl ester. This compound is separated from the reaction mixture, dissolved in ether and then reduced with a small molar excess of lithium aluminum hydride to produce the 3-pyrrolidyl enamine of 4-fluoro-11β,21-dihydroxy-4,6,17(20)-[cis]-pregnatrien-3-one. The enamine group is hydrolyzed with sodium hydroxide in methanol to produce 4-fluoro-11β,21-dihydroxy-4,6,17(20)-[cis]-pregnatrien-3-one. The 21-hydroxy group of this compound is esterified with acetic anhydride in pyridine produces 4-fluoro-11β,21-dihydroxy-4,6,17(20)-[cis]-pregnatrien-3-one 21-acetate. Oxidative hydroxylation of this compound with a catalytic amount of osmium tetroxide and about 2.75 molar equivalents of N-methylmorpholine oxide peroxide in tertiary butyl alcohol is productive of 4 - fluoro - 11β,17α,21-trihydroxy-4,6-pregnadiene-3,20-dione 21-acetate. This compound has anti-inflammatory and glucocorticoid activity and can be converted to other compounds also having this activity by dehydrogenating with selenium dioxide or corynbacterium to produce 4-fluoro - 11β,17α,21 - trihydroxy-1,4,6-pregnatriene-3,20-dione 21-acetate and 4-fluoro-11β,17α,21-trihydroxy-1,4,6-pregnatriene-3,20-dione, respectively, or by selectively hydrogenating the Δ$^6$-double bond with a molar equivalent of hydrogen at atmospheric pressure in the presence of a hydrogenation catalyst, e.g., palladium on zinc oxide, zinc carbonate, charcoal or strontium carbonate, to produce 4-fluoro - 11β,17α,21 - trihydroxy-4-pregnene-3,20-dione 21-acetate. This compound can also be dehydrogenated with selenium oxide or corynbacterium to produce 4 - fluoro-11β,17α,21-trihydroxy-1,4-pregnadiene-3,20-dione 21-acetate and 4-fluoro-11β,17α,21-trihydroxy-1,4 - pregnadiene-3,20-dione, respectively. 4-fluoro-11β,17α,21-trihydroxy-4-pregnene-3,20-dione 21-acetate, 4-fluoro-11β,17α,21-trihydroxy-4,6-pregnadiene-3,20-dione 21-acetate, 4 - fluoro-11β,17α,21-trihydroxy-1,4-pregnadiene-3,20-dione 21-acetate and 4-fluoro-11β,17α,21-trihydroxy-1,4,6-pregnatriene-3,20-dione 21-acetate can each be converted to the corresponding 9α-fluoro-11β-hydroxy compounds by the well-known series of reactions involving dehydrating the 11β-hydroxy group, e.g., with a mixture of N-bromoacetamide and anhydrous sulfur dioxide to produce the corresponding Δ$^{9(11)}$-compound; reacting the Δ$^{9(11)}$-compound with aqueous N-bromoacetamide in the presence of a catalytic amount of perchloric acid to produce the corresponding 9α - bromo-11β - hydroxy compound; reacting the 9α-bromo-11β-hydroxy compound with base, e.g., potassium acetate in acetone or potassium hydroxide in methanol to produce the corresponding 9β,11β-epoxy compound; and reacting the thus-produced 9β,11β-epoxy compound with aqueous or anhydrous hydrogen fluoride at low temperatures, thereby producing the corresponding 9α-fluoro-11β-hydroxy compound, i.e., 4,9α - difluoro-11β,17α,21-trihydroxy-4-pregnene-3,20-dione 21-acetate, 4,9α-difluoro-11β,17α,21-trihydroxy-4,6- pregnadiene-3,20-dione 21-acetate, 4,9α-difluoro-11β,17α,21-trihydroxy-1,4-pregnadiene-3,20-dione 21-acetate and 4,9α - difluoro - 11β,17α,21-trihydroxy-1,4,6-pregnatriene-3,20-dione 21-acetate, respectively. Each of the above-named 11β-hydroxy and 9α-fluoro-11β-hydroxy compounds can be oxidized, e.g., with N-bromoacetamide in acetone to produce the corresponding 11-keto and 9α-fluoro-11-keto compounds or hydrolyzed, e.g., with aqueous sodium bicarbonate in methanol under nitrogen to produce the corresponding 21-hydroxy compounds. All of the above-named 3,20-diketo-4-fluoro-11-oxygenated-unsaturated-pregnenes possess anti-inflammatory and glucocorticoid activity and have the same therapeutic uses as and can be administered in the same manner as hydrocortisone and its esters.

We claim:
1. A process for the production of 4,4-difluoro-Δ$^5$-3-keto steroids which comprises reacting the 3-enamine of a Δ$^4$-3-keto steroid unsubstituted at position 4, with at least 2 molar equivalents of perchloryl fluoride in a solution of the enamine in a solvent inert to the perchloryl fluoride and at a reaction temperature between about −75° C. and the boiling point of the reaction mixture.

2. The process of claim 1 wherein the 3-enamine is the pyrrolidyl enamine.

3. The process of claim 1 wherein the 3-enamine is the pyrrolidyl enamine and the A and B rings of the starting steroid are otherwise unsubstituted.

4. The process of claim 1 wherein the starting steroid is the 3-pyrrolidyl enamine of 3,11-diketo-4,17(20)-[cis]-pregnadien-21-oic acid methyl ester.

5. A process for the production of a 4-fluoro-Δ$^{4,6}$-3-keto steroid which comprises the steps of (1) reacting a 4,4-difluoro-Δ$^5$-3-keto steroid with a hydrazine to produce the 3-hydrazone thereof; (2) heating the thus-produced hydrozone with strong acid to produce a hydrazone of a 4-fluoro-Δ$^{4,6}$-3-keto steroid; and (3) hydrolyzing the hydrazone group to regenerate the 3-keto group and produce a 4-fluoro-Δ$^{4,6}$-3-keto steroid.

6. The process of claim 5 where the hydrazine is 2,4-dinitrophenylhydrazine.

7. The process of claim 5 wherein the hydrazine is semicarbazide.

8. The process of claim 5 wherein the strong acid is acetic acid.

9. The process of claim 5 wherein the hydrazone group is hydrolyzed with pyruvic acid.

10. The process of claim 5 wherein the hydrazine is semi-carbazide, the strong acid is glacial acetic and the hydrazone group is hydrolyzed with pyruvic acid.

11. A process for the production of a 4-fluoro-Δ$^{4,6}$-3-keto steroid which comprises the steps of (1) reacting the 3-enamine of a Δ$^4$-3-keto steroid unsubstituted at position 4 with at least 2 molar equivalents of perchloryl fluoride in a solution of the enamine in a solvent inert to the perchloryl fluoride and at a reaction temperature between about −75° C. and the boiling point of the reaction mixture to produce a 4,4-difluoro-Δ$^5$-3-keto steroid; (2) reacting the thus-produced steroid with a aryl hydrazine to produce the 3-hydrazone thereof; (3) heating the thus-produced 3-hydrazone with strong acid to produce a aryl hydrazone of a 4-fluoro-Δ$^{4,6}$-3-keto steroid; and (4) hydrolyzing the 3-hydrazone group with a compound containing an activated carbonyl group to produce a 4-fluoro-Δ$^{4,6}$-3-keto steroid.

12. The process of claim 11 wherein the 3-enamine is the pyrrolidyl enamine.

13. The process of claim 11 wherein the 3-enamine is the pyrrolidyl enamine and the A and B rings of the starting steroid are otherwise unsubstituted.

14. The process of claim 11 wherein the hydrazine is semicarbazide.

15. The process of claim 11 wherein the hydrazine is semicarbazide, the strong acid is acetic acid and the hydrazone group is hydrolyzed with pyruvic acid.

16. The process of claim 11 wherein the 3-enamine is the pyrrolidyl enamine and the A and B rings of the starting steroid is otherwise unsubstituted, the hydrazine is semicarbazide, the strong acid is acetic acid and the hydrazone group is hydrolyzed with pyruvic acid.

17. A compound selected from the group consisting of 3,11-diketo-4,4-difluoro-5,17(20)-pregnadien-21-oic acid lower-alkyl ester represented by the formula

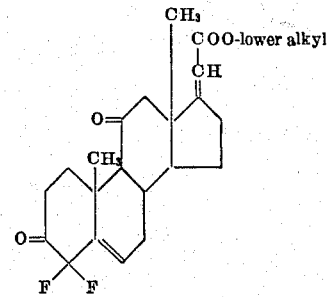

and the 3-hydrazones thereof.

18. 3,11-diketo-4,4-difluoro-5,17(20)-[cis]-pregnadien-21-oic acid methyl ester.

19. 3,11-diketo-4,4-difluoro-5,17(20)-[cis]-pregnadien-21-oic acid methyl ester 3-(2′,4′-dinitrophenylhydrazone).

20. 3,11-diketo-4,4-difluoro-5,17(20)-[cis]-pregnadien-21-oic acid methyl ester 3-semicarbazone.

21. A compound selected from the group consisting of 3,11-diketo-4-fluoro-4,6,17(20)-pregnatrien - 21-oic acid lower-alkyl ester represented by the formula

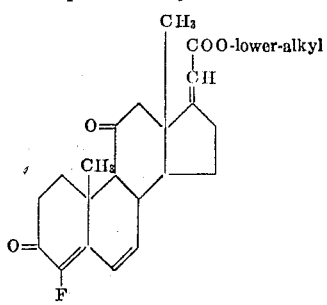

and the 3-hydrazones thereof.

22. 3,11-diketo-4-fluoro - 4,6,17(20)-[cis]-pregnatrien-21-oic acid methyl ester.

23. 3,11-diketo-4-fluoro - 4,6,17(20)-[cis]-pregnatrien-21-oic acid methyl ester 3-(2',4'-dinitrophenylhydrazone).

24. 3,11-diketo-4-fluoro - 4,6,17(20)-[cis]-pregnatrien-21-oic acid methyl ester 3-semicarbazone.

25. 4-fluoro-4,6-androstadiene-3,17-dione.

26. 4-fluoro-4,6-pregnadiene-3,20-dione.

27. 4-fluoro-11$\beta$,17$\alpha$,21-trihydroxy - 4,6-pregnadiene-3,20-dione 21-acetate.

28. 4-fluoro-11$\beta$,17$\alpha$,21-trihydroxy-1,4,6-pregnatriene-3,20-dione.

29. 4-fluoro-11$\beta$,17$\alpha$,21-trihydroxy - 1,4,6-pregnatriene-3,20-dione 21-acetate.

References Cited by the Examiner

Gabbard et al.: J. Org. Chem., vol. 23, p. 1406 (1958).
Nakanishi et al., "Chemistry and Industry," September 1960, pages 1136–1137 relied on.

LEWIS GOTTS, *Primary Examiner.*

LESLIE H. GASTON, IRVING MARCUS, ELBERT L. ROBERTS, *Assistant Examiners.*

UNITED STATES PATENT OFFICE
CERTIFICATE OF CORRECTION

Patent No. 3,232,960                      February 1, 1966

Barney J. Magerlein et al.

It is hereby certified that error appears in the above numbered patent requiring correction and that the said Letters Patent should read as corrected below.

Column 1, line 29, for "sigmastane" read -- stigmastane --; lines 56 to 65, formula "( I )" should appear as shown below instead of as in the patent:

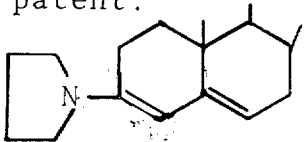

column 2, lines 5 to 10, formula "(III)" should appear as shown below instead of as in the patent:

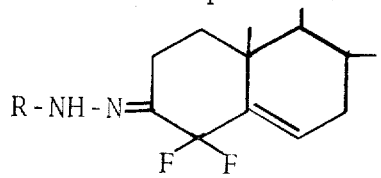

line 58, for "-keta" read -- -keto --; line 60, for "carbaloxy" read -- carbalkoxy --; column 5, line 29, for "4-17" read -- 4,17 --; column 6, line 29, for "-pregnadien" read ---pregnatrien --; column 10, line 9, for "where" read -- wherein --.

Signed and sealed this 7th day of February 1967.

(SEAL)
Attest:

ERNEST W. SWIDER                      EDWARD J. BRENNER
Attesting Officer                   Commissioner of Patents